US012480986B1

(12) United States Patent
Tsironis

(10) Patent No.: US 12,480,986 B1
(45) Date of Patent: Nov. 25, 2025

(54) MECHANISM FOR REMOTELY CONTROLLING THE CONTACTING OF WAFER PROBES ATTACHED TO LOAD PULL TUNERS

(71) Applicant: Christos Tsironis, St-Laurent (CA)

(72) Inventor: Christos Tsironis, Kirkland (CA)

( * ) Notice: Subject to any disclaimer, the term of this patent is extended or adjusted under 35 U.S.C. 154(b) by 87 days.

(21) Appl. No.: 17/827,861

(22) Filed: May 30, 2022

(51) Int. Cl.
*G01R 31/28* (2006.01)

(52) U.S. Cl.
CPC ............................... *G01R 31/2867* (2013.01)

(58) Field of Classification Search
CPC .. G01R 31/2822; G01R 27/28; G01R 35/005; G01R 27/30; G01R 27/32; G01R 29/10; G01R 1/06772; G01R 1/26; G01R 31/2841; G01R 31/316; G01R 31/31924; G01R 33/3628; G01R 33/3635; G01R 31/2831; G01R 31/2893; G01R 1/28; G01R 23/00; H01P 1/212; H01P 5/04; H01P 3/12; H01P 3/121; H01P 3/122; H01P 5/08; H01P 5/16; H03H 7/40; H03H 7/38; H03J 9/00; G04B 17/063; G04B 18/006; G05B 11/01; G05B 17/02; G05B 2219/23021; G05G 1/52; G05G 2009/04766; G05G 9/047

See application file for complete search history.

(56) References Cited

U.S. PATENT DOCUMENTS

| 3,009,109 | A | * | 11/1961 | Jankowski | ............. | G01R 31/00 324/537 |
| 3,038,121 | A | * | 6/1962 | Gray | ...................... | G04D 7/003 73/1.53 |
| 3,185,927 | A | * | 5/1965 | Margulis | ................ | G01R 1/073 324/759.02 |
| 4,383,217 | A | * | 5/1983 | Shiell | ..................... | G01R 27/14 324/754.03 |
| 6,515,498 | B1 | * | 2/2003 | Kobayashi | ......... | G01R 31/2886 324/756.04 |
| 7,102,457 | B1 | * | 9/2006 | Tsironis | ............. | G01R 31/2893 333/263 |
| 7,554,321 | B2 | * | 6/2009 | Holt | ................... | G01R 31/2851 324/759.03 |
| 8,933,707 | B1 | * | 1/2015 | Tsironis | ............. | G01R 31/2831 324/207.13 |
| 9,431,999 | B1 | * | 8/2016 | Tsironis | .................... | H03J 1/06 |

(Continued)

OTHER PUBLICATIONS

"Load Pull Measurements" [online], Wikipedia [retrieved on Nov. 18, 2016] Retrieved from Internet <URL:http://en.wikipedia.org/wiki/Load_pull>.

(Continued)

*Primary Examiner* — Vinh P Nguyen

(57) ABSTRACT

An on-wafer load pull tuner system includes an intelligent, universal, remotely controlled, mechanical wafer-probe contact controlling device, supporting automatic microwave single or multi-probe balanced slide screw tuners. It allows contacting and stable on-wafer testing of sub-micrometric devices. Ultra-low loss rigid airlines (bend-lines) used to connect the tuner with the semiconductor chips, in order to improve the tuning range at the DUT reference plane, transfer mechanical contact control movements of the wafer probes attached to the rigid bend-lines, when a counterweight tilts the tuner assembly by controlling the center of gravity of the assembly.

5 Claims, 8 Drawing Sheets

(56) References Cited

U.S. PATENT DOCUMENTS

| | | | | |
|---|---|---|---|---|
| 10,537,122 B2* | 1/2020 | McKinney | ............. | A23K 50/75 |
| 10,693,437 B1* | 6/2020 | Tsironis | ............... | G01R 1/0466 |
| 10,725,094 B1* | 7/2020 | Tsironis | ............. | G01R 31/2621 |
| 11,002,762 B1* | 5/2021 | Tsironis | ............. | G01R 1/06772 |
| 11,327,101 B1* | 5/2022 | Tsironis | ................. | G01R 27/32 |
| 11,506,708 B1* | 11/2022 | Tsironis | .................... | H03J 1/06 |
| 11,581,623 B1* | 2/2023 | Tsironis | ................. | H01P 1/182 |
| 11,598,790 B1* | 3/2023 | Tsironis | ............. | G01R 1/06772 |
| 11,688,919 B1* | 6/2023 | Tsironis | .................. | H03H 7/40 |
| | | | | 324/537 |

OTHER PUBLICATIONS

"Computer Controlled Microwave Tuner, CCMT", Product Note 41, Focus Microwaves Inc. 1998.

"Manual Probe Stations" Datasheet [online], MicroXact [retrieved on May 3, 2022] Retrieved from Internet <http://microxact.com/product/manual-probe-stations/>.

* cited by examiner

MECHANISM FOR REMOTELY CONTROLLING THE CONTACTING OF WAFER PROBES ATTACHED TO LOAD PULL TUNERS

PRIORITY CLAIM

Not Applicable

CROSS-REFERENCE TO RELATED ARTICLES

1. "Load Pull Measurements" [online], Wikipedia [retrieved on Nov. 18, 2016] Retrieved from Internet <URL: http://en.wikipedia.org/wiki/Load_pull>.
2. "Computer Controlled Microwave Tuner-CCMT", Product Note 41, Focus Microwaves Inc., January 1998.
3. "Manual Probe Stations" Datasheet [online], MicroXact [retrieved on May 3, 2022] Retrieved from Internet <http://microxact.com/product/manual-probe-stations/>.
4. Tsironis, C. U.S. Pat. No. 7,102,457, "Mechanically Balanced Microwave Load Pull Tuner".

BACKGROUND OF THE INVENTION

This invention relates to on-wafer load pull or source pull measurement setups, controlling remotely the mechanical tilting of the mechanically balanced tuners (within the mechanical tolerances of the 3-axis positioner holding the tuner), see ref. 4, which are rigidly connected with the wafer probes and establishing or breaking the electrical contact of the wafer probes with the test chips (DUT) to execute or stop the load pull measurement session. Here forth the term "tuner" is used equivalent to the "mechanically balanced tuner" per ref. 4.

"Source pull" and "load pull" are test methods used in generating data to help designing high-power and low noise microwave amplifiers for various telecommunication systems (see ref. 1). These measurement techniques employ microwave tuners and other microwave test equipment (FIG. 1). The microwave tuners are used in order to manipulate the microwave impedance conditions under which the Device Under Test (DUT, or transistor) is tested (FIG. 2).

A basic load pull measurement system (FIG. 1) includes a signal source, a source tuner, a test fixture housing the DUT, a load tuner and an output power meter. The tuners and the overall test system are controlled by a control computer. Through digital commands from the computer the tuner's motors position the tuner's metallic tuning probes appropriately and create impedances, which allow characterizing the DUT (see ref. 2). To test a large number of transistor chips tests are carried out "on wafer", whereby the chips are not mounted in test fixtures, instead they are accessed using micro-probes or wafer probes. The tuners are preferably connected directly to these probes in order to minimize the insertion loss between tuner and DUT and increase the "tuning range" i.e., the maximum reflection factor attainable at DUT reference plane. This is shown in FIG. 2.

The tuner 20 is mounted on a robust 3-axis tuner positioner 21; the low-loss slotted airline 22 of the tuner is connected to a wafer probe 23, which contacts the wafer chip 24 manufactured on the semiconductor wafer 25; when a mass 26 moves horizontally inside the tuner the center of gravity 27 moves as well around an external center 28. This causes the probe 23 to lift 29 or descent 201; this phenomenon is used to automate the probe contact with the wafer chip in manual wafer probe stations (see ref. 3), where automatic wafer lift is not available. In this figure the balancing mechanism per ref. 4 is not shown, because it is irrelevant for the invention. The tuner is assumed in itself always balanced.

BRIEF SUMMARY OF THE INVENTION

The problem associated with automating the wafer probe contacting with the chips on wafer when an automatic station is not used is solved by installing and remotely controlling a counterweight; this counterweight shifts the center of gravity of the tuner assembly (tuner connected the wafer probes and mounted on a 3-axis manual positioner). However, since every setup and every manual lifting of the tuner to break the contact is different, each setup and each tuner must be calibrated using a contact control procedure and the data saved for the specific configuration. This is done by mounting a remotely controlled counterweight and moving it to tilt the tuner assembly within the unavoidable tolerances of the 3-axis positioner. The method is unconventional because it relies on the imperfections of the equipment and the fact that every material, especially metals, are flexible, given the proper applied forces.

The control of the counterweight can be made using various types of practically controllable handles. In a first embodiment the handle can be a thin large disc, with belt teeth cut on its on its periphery, forming a timing belt pulley of large diameter, which carries a properly dimensioned counter-weight on its periphery and remotely controlled to rotate around an axis inserted perpendicularly either on the tuner body or on the 3-axis positioner body. In a second embodiment the means to control the position of the counterweight is a lengthy handle, like a paddle or a stub, which is controlled by the contact control motor using a lever or a timing belt. In both cases the purpose is the shifting of the center of gravity and the tilting of the tuner assembly (within the tolerances and the flexibility of the 3-axis positioner) and by consequence lifting or lowering the wafer probes. To visualize the real dimensions it is noted that, lifting the edge of an assembly by typically 2 mm around a center of gravity, located typically 20 cm away, requires a tilting by less than 0.06°, which is within the mechanical flexibility tolerances of the "tuner-3-axis positioner" assembly.

BRIEF DESCRIPTION OF THE DRAWINGS

The invention and its mode of operation will be better understood from the following detailed description, when read with the appended drawings in which.

DETAILED DESCRIPTION OF THE INVENTION

The concept of a mechanically controlled counterweight is well established in moving mechanical constructions, like cranes etc., which are not allowed to tilt and, eventually, fall. A balancing counterweight moves synchronically and in opposite direction with the load, in order to keep the center of gravity of the whole structure constant. This concept has been used, in a purely mechanical version, in impedance tuners in prior art (see ref. 4).

Figure 1:
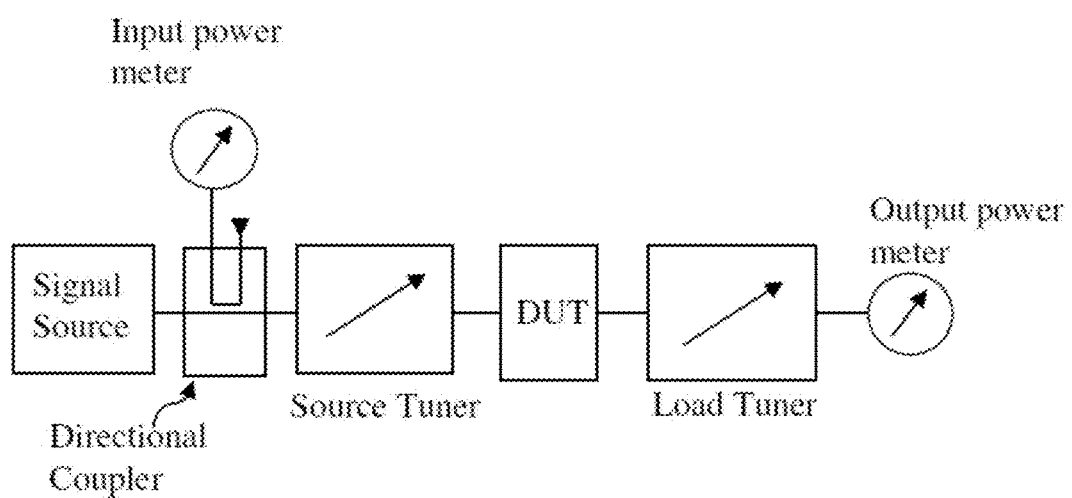
FIG. 1 depicts prior art, a block diagram of a load-pull measurement setup, in which electro-mechanical impedance tuners are used to manipulate the source and load impedances presented to the DUT.
Figure 2:
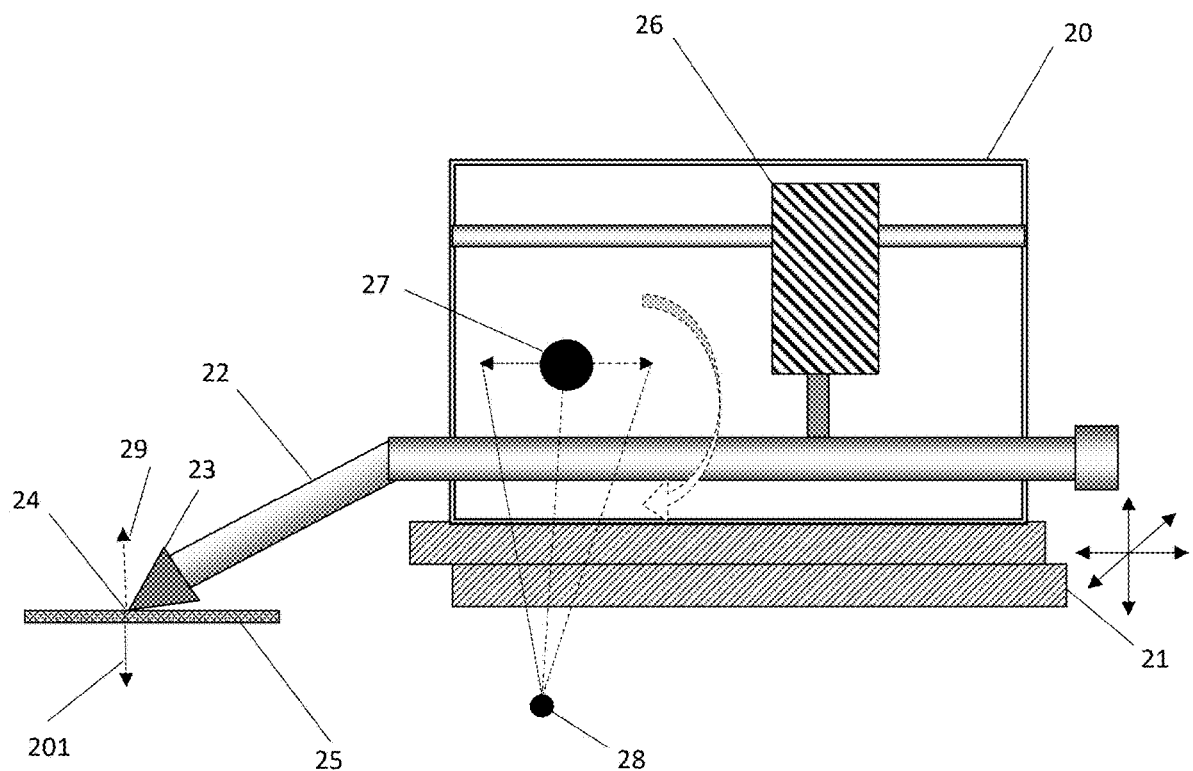
FIG. 2 depicts prior art, a front view and cross section of an automatic microwave tuner, assembled and mounted for on-wafer testing.

A slide screw load-pull tuner (FIG. 2), mounted on a 3-axis positioner 21, has a housing 20, a slotted airline (slabline) 22, which is directly connected to the wafer-probe 23, which contacts with the chip 24 on the semiconductor wafer 25. As the mobile carriage 26 moves horizontally, it shifts the center of gravity 27 of the assembly tuner, wafer-probe and 3-axis positioner 21. This causes the whole assembly to rotate slightly around a rotation center 28, which on its side causes the wafer-probe 23 to lift 29 or lower 201. If it lifts the contact is lost and the measurement stops. If it lowers, it may crash on the chip and break plus destroy the chip. Movement tolerances are very tight. More than a few micrometers are not acceptable.

Figure 3:
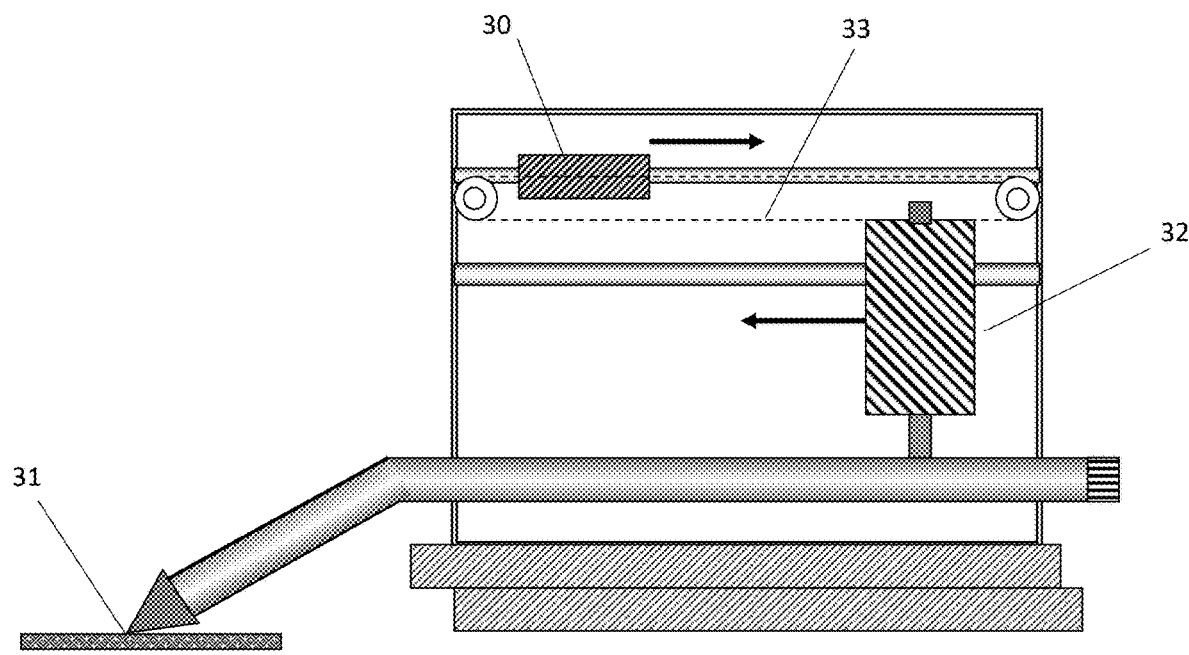
FIG. 3 depicts prior art: an internally mechanically balanced impedance tuner, per. ref. 4, directly connected to a wafer probe contacting a test chip on wafer.

To eliminate the risk of catastrophic failure an internal balancing mechanism has been introduced (FIG. 3); an internal counterweight 30 is controlled by a belt 33 and moves opposite the carriage 32 keeping the center weight fixed at all times and the probe tips 31 in steady reliable contact with the wafer. Further down in this invention a tuner is considered to be an internally balanced tuner as in FIG. 3.

In general, automatic wafer probe stations control wafer-probe contacting and releasing the chips by lowering and lifting the platform holding the wafer. Many probe stations though, are manually controlled and have not this ambitious capability. Ambitious because the mechanics must control the considerable massive the platform with micrometric accuracy to avoid crashing the probe tips; this makes automatic stations several times more expensive than manual ones; in fact, automatic stations are used only for mass production testing. This makes an automated solution of wafer-probe contact control for manual stations an attractive option. This is what the invention does.

Figure 4:
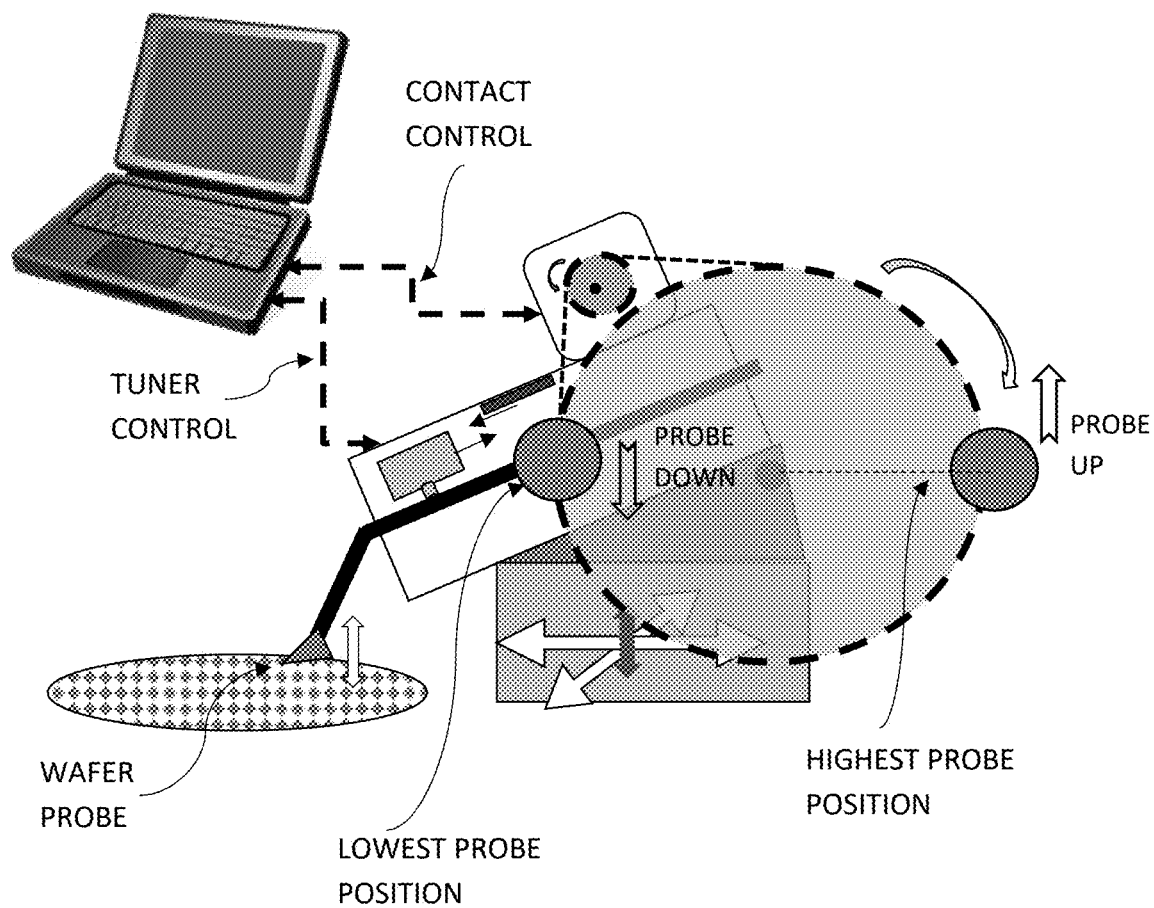
FIG. 4 depicts the general concept of contacting control using a rotating un-balancing counterweight.

FIG. 4 shows the concept of a first embodiment of the contact control mechanism; the balanced tuner is mounted on a 3-axis positioner. Its center conductor is bent and in direct contact with the wafer probe. A counterweight is attached on the periphery of a large disc having time belt compatible teeth on its periphery and rotating around an axis, which may be located on the tuner body, but preferably on the tuner support block of the 3-axis positioner. The disc is rotated by a stepper motor which is motor mounted on the tuner and a timing belt. When the counterweight is rotated towards the wafer-probe the whole assembly tilts forward towards the wafer and the wafer-probe makes contact. If the counterweight moves away from the wafer-probe the assembly tilts backwards and the contact is interrupted. Continuous control of the counterweight is necessary, because the initial vertical tuner position is manually set and varies from one wafer test to the next. In any case the counterweight must be chosen so that the lowest probe position creates safe contact and the highest position safe contact interruption. Typical travel is 2-3 mm.

Figure 5:
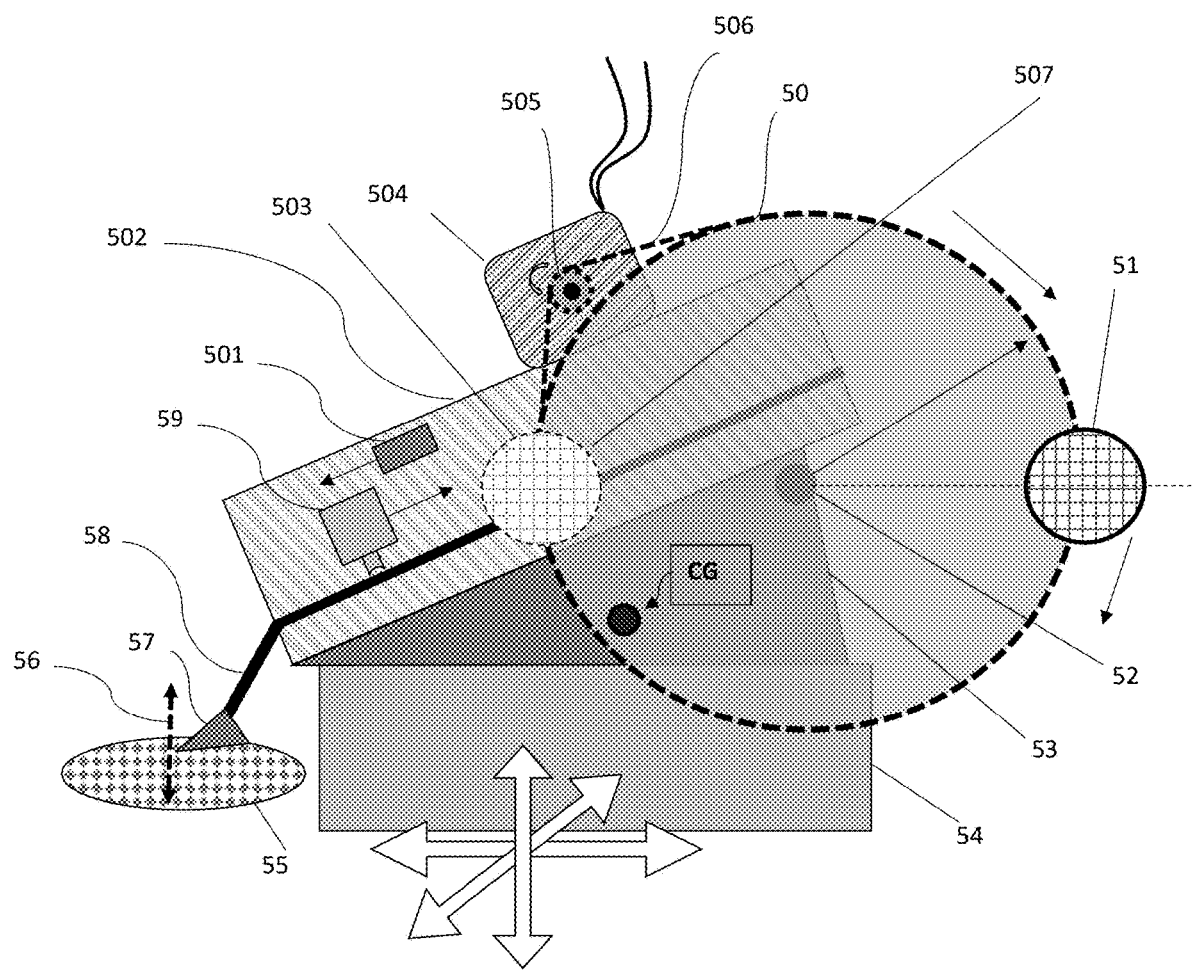
FIG. 5 depicts a first embodiment of remote wafer probe contact control using a counterweight mounted on a rotating disc.

The detailed assembly of the first embodiment is shown in FIG. 5: the balanced tuner 502 including the opposite moving masses 59 (carriage) and 501 (internal balancing counterweight) is mounted on a pyramidal support block 53 of the 3-axis positioner 54. The large disc 50 which carries the contact counterweight 51 rotates around a center axis 52, which can be plugged into the support block 53; the remotely controlled contact-control motor 504, which can be mounted either on the tuner itself or on the tuner positioner, rotates a pulley 505, which controls a timing belt 506, which controls the rotation of the disc 50 and through this rotation the position and ultimately the horizontal distance of the counterweight in extremis states 51 and 507 from the center of gravity CG of the whole assembly. This counterweight movement tilts the whole assembly around CG and by that lowers or lifts 56 the protrusion 58 of the tuner airline and the attached wafer probe 57, making or breaking the contact of the wafer-probe tips with the chips on the semiconductor wafer 55. The lowest the wafer-probe can go, in this configuration is when the counterweight is closest 503 to the wafer probe. If the initial manual lifting of the tuner assembly exceeds the lowering limit of the counterweight in position 503, then, either the initial lifting must be reduced, or a bigger counterweight 51 chosen. In any case the contacting position of the counterweight 51 must not be at position 503, it can be anywhere between 51 and 503, as long as the contacting algorithm has been executed beforehand and the said position saved. The proposed method is flexible and can accommodate virtually all manual tuner settings.

Figure 6:
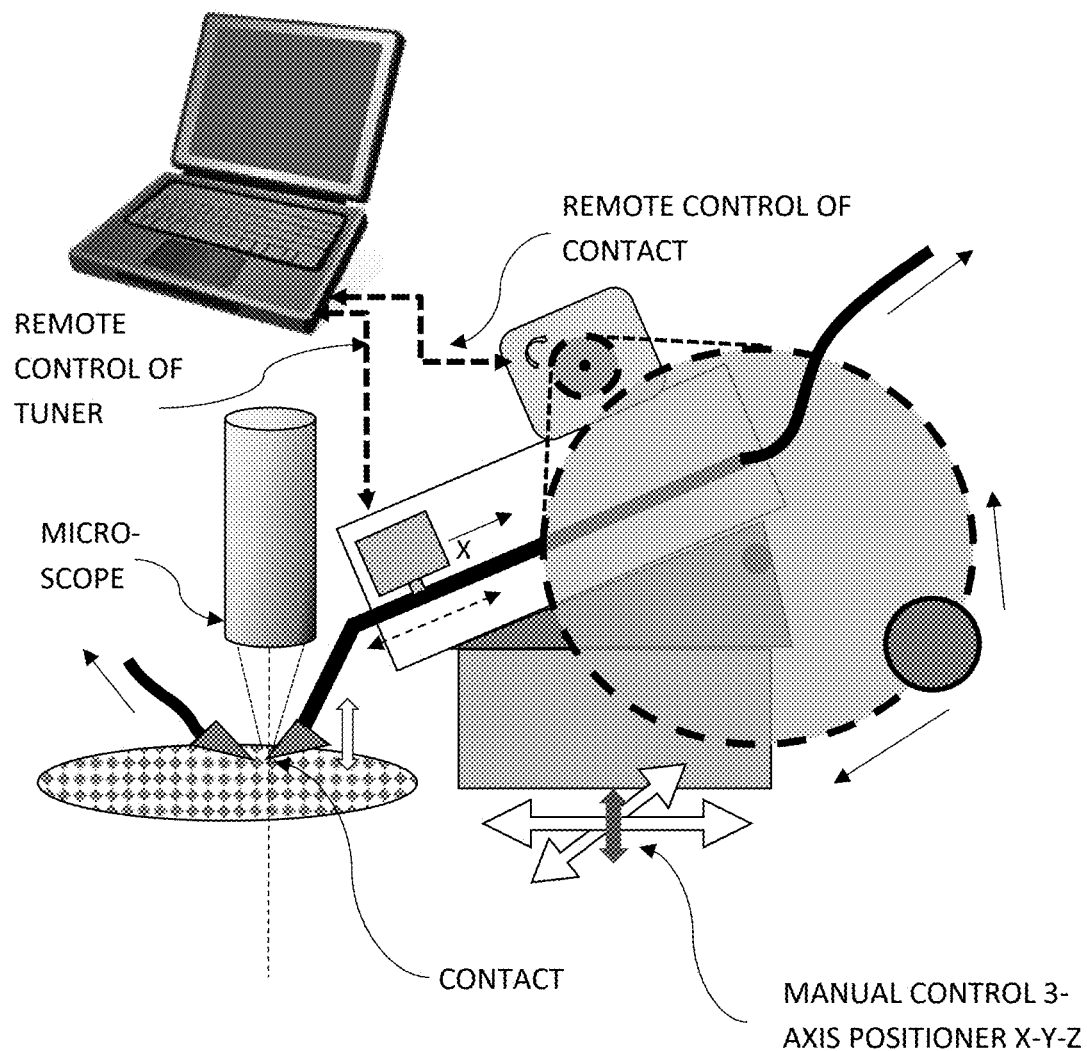
FIG. 6 depicts the setup used in the contact control procedure.

In order to determine the contacting and dis-contacting limits of the assembly one must use the setup shown in FIG. 6: In this setup a microscope is used to observe visually the status and the quality of the wafer-probe contact with the chip on wafer. The tuner assembly is moved vertically with the counterweight in a position between of lowest elevation (503 in FIG. 5) and the tuner assembly lowered to establish safe wafer-probe contact. This is the lowest position not to exceed. The counterweight is then moved away and it is checked visually if the contact breaks and creates enough space below the probe tips to allow moving the wafer to access a different chip. If this is not possible when the counterweight is at the furthest position 51, then a larger counterweight is needed. The procedure is repeated until the contact is safely established and interrupted by moving only the contact counterweight.

Figure 7:
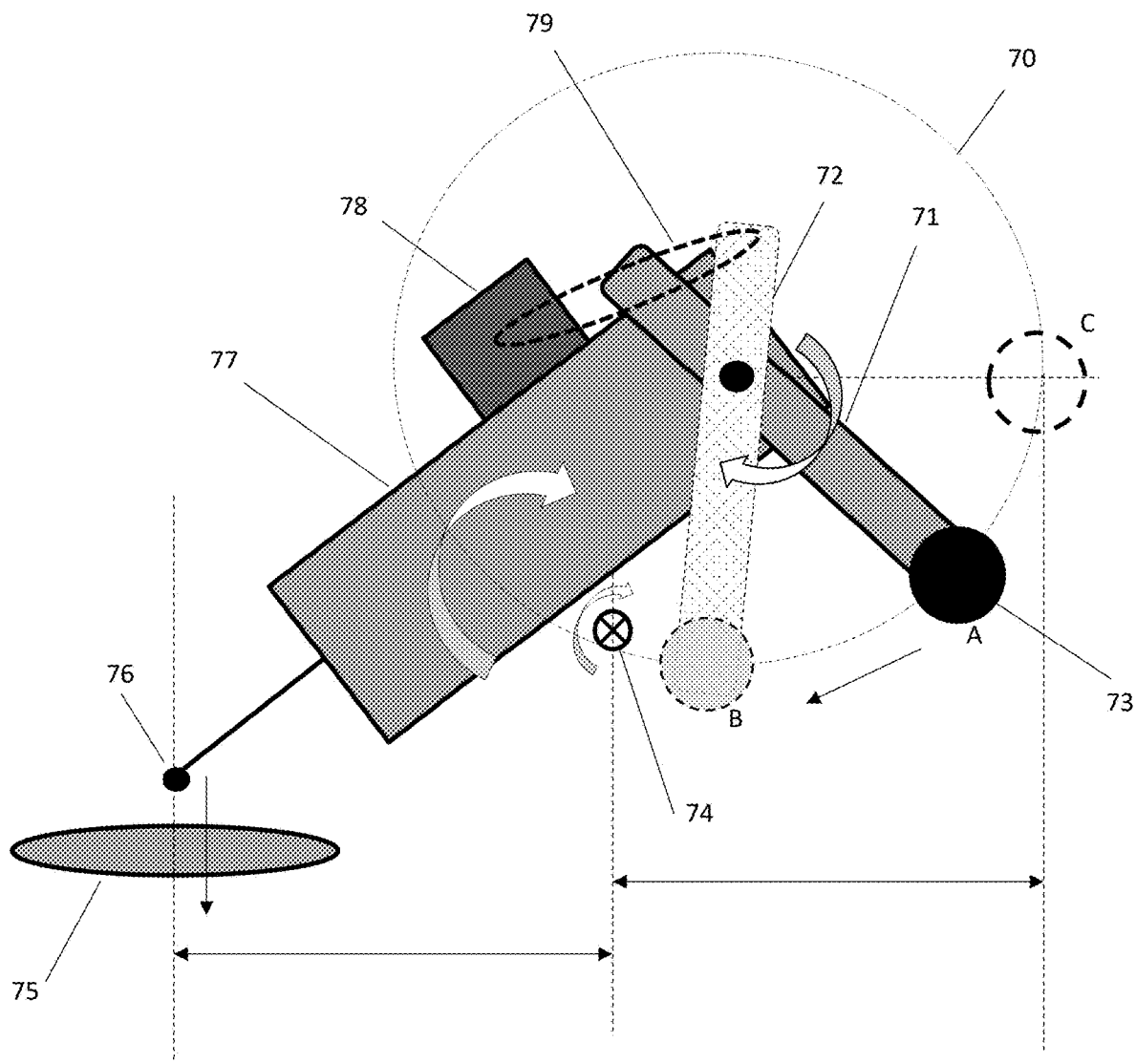
FIG. 7 depicts a second embodiment of the contact control mechanism using a stab-formed handle to hold the counterweight.

FIG. 7 depicts an alternative embodiment of the contact mechanism. The disc has been replaced by a handle 71; it rotates around the same axis 72 on a trajectory 70 as the disc does in FIG. 5; the counterweight 73 is attached at the far end of the handle 71 and can be placed in either position A, B or C to tilt the tuner 77 assembly around an axis 74 to lower or lift the wafer probe tips 76 to establish or break the contact with the semiconductor wafer 75. The rotation of the handle 71 is effectuated by the contact motor 78 and the belt 79. In both embodiments the use of a contact motor that can adjust the position of the counterweight is important, because every case of the tuner assembly is different. Not only continuous or quasi continuous adjustment is important but also high resolution of tilting, since the tolerances of the probe tips, between good contact and breaking are tight: no more than a few tenths of a millimeter.

Figure 8:
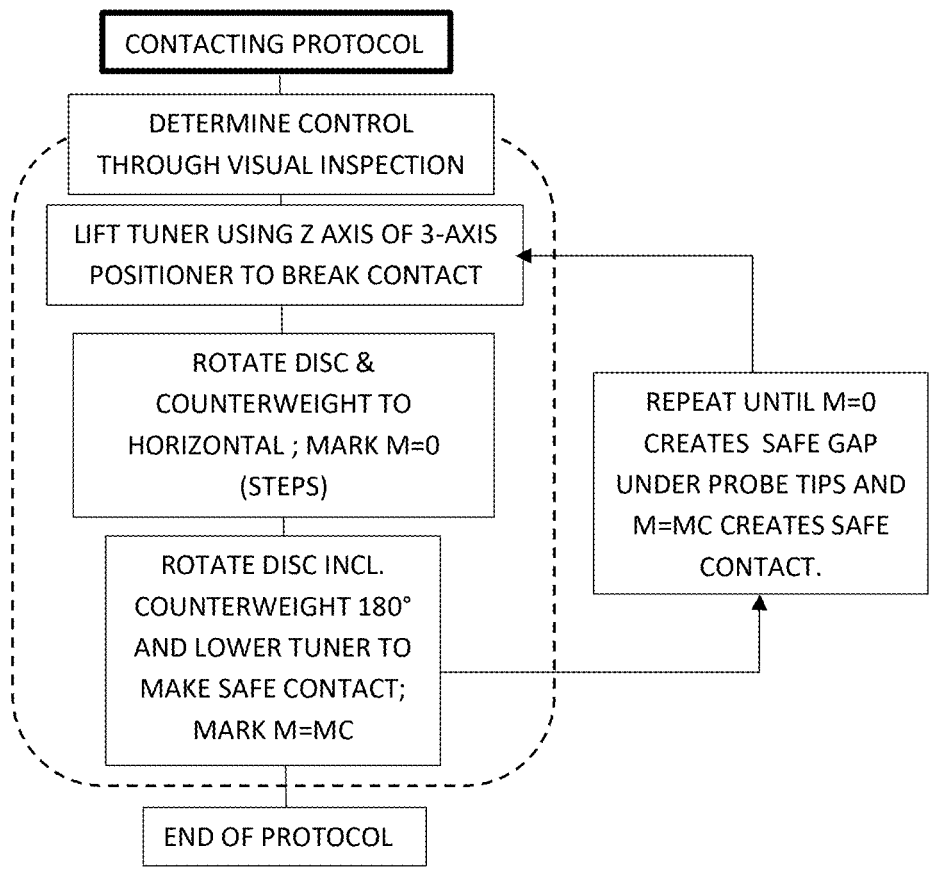
FIG. 8 depicts the flowchart of the contacting protocol.

The wafer probe contacting protocol is demonstrated using the flowchart of FIG. 8: for that the probe tips must be focused on using the microscope; then the tuner assembly is lifted enough to break a contact and leave space margin; then the disc or handle are moved to position C or 51; the contact motor 504 position is marked zero. Then the disc is rotated to position 503 and the tuner is lowered manually to create safe contact; the motor position is marked MC. By rotating the disc back to position C (motor position M=0) we check if the probes lift enough. If they do we conserve the motor position MC. If not, we increase the mass of the counterweight and repeat the procedure. The objective is to select the proper counterweight to get safe contact at M=MC and safe lifting at M=0.

A plausible question could arise, why use a small timing belt pulley 52 to rotate a large disc 55 to control the weight 57 and not simply attach the weight 57 to a rotating arm attached to balancing motor 51? The answer is twofold: 1) the resolution: Balancing motor 51 has a 1.8°/step resolution, whereas disc 55 has one tenth of this, or even less, depending on the ratio r/R, and 2) the effective holding torque for motor 51 which is multiplied tenfold or more by the factor R/r.

The wafer-probe contacting mechanism of a tuner test setup has been presented using basic embodiments. It allows balancing the movement of the tuner carriage(s) and control the making and breaking of the probe contact with the DUT chip. Obvious alternatives shall not impede on the basic idea of controlling balancing and contacting using a single automatic control.

What is claimed is:

1. A remotely controlled mechanism for making or interrupting contact between a wafer probing assembly and a semiconductor wafer,
wherein
the wafer probing assembly includes at least a balanced load pull tuner directly and rigidly connected with a wafer probe and controlled by a 3-axis positioner;
and wherein the remotely controlled mechanism comprises:
a control device attached to the wafer probing assembly, said control device including a counterweight mounted on a handle which is remotely controlled by a stepper motor.

2. The remotely controlled mechanism for making or interrupting a contact between a wafer probing assembly and a semiconductor wafer as in claim 1,
wherein the handle of the control device is a disc controlled by the stepper motor, rotating vertically around an axis perpendicular to the balanced load pull tuner, holding the counterweight at its periphery.

3. The remotely controlled mechanism for making or interrupting a contact between a wafer probing assembly and a semiconductor wafer as in claim 1,
wherein the handle of the control device is a radial stub controlled by the stepper motor, rotating vertically around an axis perpendicular to the balanced load pull tuner, holding the counterweight close to its far end.

4. The remotely controlled mechanism for making or interrupting a contact between a wafer probing assembly and a semiconductor wafer as in claim 3,
wherein the stepper motor controlling the handle is mounted on the balanced load pull tuner.

5. The remotely controlled mechanism for making or interrupting a contact between a wafer probing assembly and a semiconductor wafer as in claim 1, wherein the axis of the handle is mounted on the 3-axis positioner.

* * * * *